United States Patent [19]

Lysenko et al.

[11] Patent Number: 5,736,748
[45] Date of Patent: Apr. 7, 1998

[54] POLYOLS HAVING REDUCED TERMINAL UNSATURATION AND A PROCESS FOR PRODUCING SAME

[75] Inventors: Zenon Lysenko; Ritchie A. Wessling, both of Midland, Mich.

[73] Assignee: The Dow Chemical Company, Midland, Mich.

[21] Appl. No.: 677,749

[22] Filed: Jul. 10, 1996

Related U.S. Application Data

[60] Provisional application No. 60/001,018 Jul. 10, 1995.
[51] Int. Cl.$^6$ ............................................. C09K 3/08
[52] U.S. Cl. ........................... 252/182.26; 252/18.24; 252/182.27
[58] Field of Search .............. 252/182.26, 182.24, 252/182.27; 548/125, 240; 568/583, 606

[56] References Cited

U.S. PATENT DOCUMENTS

| | | | |
|---|---|---|---|
| 2,996,556 | 8/1961 | Ilgenfritz et al. | 260/653.5 |
| 3,271,462 | 9/1966 | Earing | 260/615 |
| 3,763,177 | 10/1973 | Tomalia et al. | 260/307 F |
| 3,878,220 | 4/1975 | Breslow | 260/296 M |
| 4,764,567 | 8/1988 | Ott | 525/403 |
| 5,095,061 | 3/1992 | Chavez, Jr. et al. | 524/376 |
| 5,298,637 | 3/1994 | Cooper | 554/169 |
| 5,342,541 | 8/1994 | Chavez, Jr. et al. | 252/182.27 |
| 5,442,028 | 8/1995 | Fromwiller et al. | 528/44 |

FOREIGN PATENT DOCUMENTS

| | | |
|---|---|---|
| 1812003 | 6/1970 | Germany. |
| 1474691 | 5/1977 | United Kingdom. |

OTHER PUBLICATIONS

Yabukov, A. P. et al., *Synthesis of Functionally Substituted Nitrile Oxides of the Aromatic Series*, N. D. Zelinsky Institute of Organic Chemistry, Academy of Sciences of the USSR, Moscow. Translated from Izvestiya Akademii Nauk USSR, Seriya Kimicheskaya, No. 5, pp. 1201–1203 (May 1991).

Yabukov, A. P. et al., *Synthesis Sterically Hindered Aromatic Aldehydes*, N. D. Zelinsky Institute of Organic Chemistry, Academy of Sciences of the USSR, Moscow, Translated from Izvestiya Akademii Nauk USSR, Seriya Khimicheskava, No. 7, pp. 1609–1615 (Jul. 1991).

Yabukov, A. P. et al., *Synthesis Sterically Hindered Aromatic Dialdehydes*, N. C. Zelinsky Institute of Organic Chemistry, Academy of Sciences of the USSR, Moscow. Translated from Izvestiya Akademii Nauk USSR, Seriya Khimicheskaya, No. 7, pp. 1700–1703 (Jul. 1991).

Greiss, *Styrene, Its Polymers, Copolymers and Derivatives*, ed. Boundy et al., Reinhold Publishig Corp., New York: pp. 859–860 (1952).

Miyamoto, M. et al., Preparation of Block Copolymer Consisting of Poly(2–methyl–2–oxazoline) and Poly(propylene oxide) Blocks, A New Nonionic Surfactant. *Polymer Journal*, vol. 24 No. 4: pp. 405–409 (1992).

*Primary Examiner*—Joseph McKane

[57] ABSTRACT

The unsaturation of a hydroxyl-containing compound can be reduced by reaction with a nitrile oxide compound such as tetramethyl terephthalonitrile, N,N'-dioxide. The reaction of a nitrile oxide with terminal unsaturation associated with the preparation of a polyol from propylene oxide reduces the monol content of the polyol composition.

15 Claims, No Drawings

POLYOLS HAVING REDUCED TERMINAL UNSATURATION AND A PROCESS FOR PRODUCING SAME

CROSS-REFERENCE TO RELATED APPLICATIONS

This application claims the benefit of U.S. Provisional application No. 60/001,018, filed Jul. 10, 1995.

BACKGROUND OF THE INVENTION

The present invention relates to polyols having reduced unsaturation and a method for preparing these polyols.

Polyols are hydroxy-functional chemicals or polymers covering a wide range of molecular weight, hydroxy functionality and composition. The predominant use of polyols such as poly(propylene oxide/ethylene oxide) (poly(PO/EO)) and poly(propylene oxide) (poly(PO)) based polyols is as a component in the manufacture of polyurethane or polyurea polymers or resins. They are also useful as components or intermediates for other polymers including polyesters and epoxy resins. In addition, a polyol can be further reacted with hydroxyl reactive compounds such as additional alkylene oxide, unsaturated dibasic carboxylic or polycarboxylic acids to form a polymeric polyol for subsequent reaction.

The polyol properties affect the properties of the polymers made using the polyol. For example, a flexible polyurethane foam is commonly made using linear or slightly branched polyols whereas a rigid polyurethane foam is made using branched polyols. In addition, the polyol functionality and primary hydroxyl content of the polyol affects its reactivity. The reactivity of a polyol toward urethane-forming reactants (for example, isocyanate-functional groups) is an important property which affects the resulting polymer properties as well as its processing. Other properties such as the viscosity, solubility, and stability of the polyols are also important.

In a typical process, the polyol is prepared by contacting an alkylene oxide such as ethylene oxide, propylene oxide, butylene oxide or mixtures thereof with an active hydrogen initiator, typically a polyhydric initiator such as glycerol, generally in the presence of a catalyst such as a base, for example, potassium hydroxide, or an amine. Following preparation, the reaction product is purified to reduce the catalyst level and other by-products. The resulting product is a polyol with predominantly hydroxyl end groups. However, propylene oxide can isomerize during reaction to give an allyl alcohol which may further undergo alkoxylation (for example, propoxylation); thereby resulting in a number of chains capped with terminal unsaturation, for example, propoxylated allyl alcohol which is monofunctional and known as "monol." This is particularly evident when a basic catalyst is employed.

This is undesirable in the preparation of polyurethanes, since the unsaturation is unreactive with the isocyanate functionality. The unreacted, particularly terminal, unsaturation is also susceptible to environmental influences and can adversely affect the properties such as compressive and tensile strengths, discoloration, flexural modulus and humid aging, of the resulting polymer. In particular, the modulus of a flexible polyurethane or polyurea foams or elastomeric polymers is reduced as the amount of unsaturation or monohydroxyl compound increases.

One reported method for reducing the unsaturation in a polyol composition is to treat the product of the reaction of the initiator and the alkylene oxide with an acid. See, for example, U.S. Pat. Nos. 2,996,556 and 3,271,462. However, the acid must be removed after treatment.

In yet another method for reducing the propenyl polyethers in hydroxy-functional polyethers, U.S. Pat. No. 5,095,061 teaches contacting a neutral polyol with an acid catalyst and water to convert the propenyl polyether to propionaldehyde, contacting the resulting product with an epoxy to scavenge the acid catalyst, and then removing the water and propionate. Similarly, U.S. Pat. No. 5,342,541 teaches contacting a polyether polyol with an acid ion exchange resin and water to convert the propenyl polyether to propionaldehyde, and then contacting the resulting product with an epoxy to reduce the acidity of the polyol. However, both the described processes involve additional steps such as the removal of acid.

It would be desirable to reduce the unsaturation, particularly the terminal unsaturation to reduce the monol content, of a polyol composition.

SUMMARY OF THE INVENTION

Accordingly, in one aspect, the present invention is a polyol composition comprising a polyol derived from a hydroxyl-containing compound having unsaturation reacted with a nitrile oxide compound.

A nitrile oxide moiety is capable of reacting with terminal or internal, for example, propenyl, unsaturation. In a preferred embodiment, the unsaturation is terminal and the nitrile oxide reduces the terminal unsaturation. More preferably, the hydroxyl compound reacted with the nitrile oxide is a monol having terminal unsaturation. In the preferred embodiment, the polyol composition is believed to comprise at least one polyol having an isoxazoline moiety. The polyol is a compound of the formula:

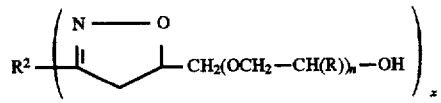

where n is an integer of one or more, each R is independently hydrogen, methyl or ethyl, with at least some R being preferably methyl; x is an integer of one or more, and $R^2$ is a residual of a nitrile oxide compound.

In a second aspect, the present invention is an improved method for preparing a polyol. In the improved method for making a polyol from the reaction of an alkylene oxide, preferably propylene oxide, with an initiator, the improvement is reacting unsaturation, preferably terminal unsaturation, of the reaction product with a nitrile oxide compound. Preferably, the nitrile oxide compound is a stable di(nitrile oxide) or a compound having a nitrile oxide and a hydroxyl (—OH) group.

The unsaturation in the reaction product reacts with the nitrile oxide without the evolution or formation of a by-product. As such, the terminal unsaturation, as well as molecules having one or more non-hydroxyl terminated chains, for example, monols, is reduced or substantially eliminated in the composition. For example, when the nitrile oxide compound is a dinitrile oxide having no hydroxyl group, the nitrile oxide compound will react with two monols to form a polyol. Alternatively, if the nitrile oxide compound is a mononitrile oxide containing a hydroxyl group, the reaction of the hydroxyl group of the nitrile oxide compound with the unsaturation will directly impart an additional hydroxyl functionality to the resulting reaction product.

The process of the present invention provides a more economical means for preparing polyols since the need for the careful and costly control to reduce the the unsaturation, particularly the terminal unsaturation which can result in monols, to insignificant amounts is rendered less critical. The polyol compositions are useful in the preparation of polymers formed from polyols, particularly in the subsequent preparation of polyurethane and, in another aspect, the present invention is a polyurethane formed from these polyol compositions.

DETAILED DESCRIPTION OF THE INVENTION

In the present invention, the polyol composition comprises a polyol derived from a hydroxyl-containing compound having an unsaturated group, generally a terminal unsaturation, which has been reacted with a nitrile oxide compound. In general, the polyol composition will contain other polyols which contain no terminal unsaturation. By the term "polyol," it is meant a compound having two or more hydroxyl (—OH) groups with the term "monol" being a compound having one hydroxyl group. Following reaction with the nitrile oxide, it is believed that the polyol comprises an isoxazoline moiety.

The hydroxyl-containing compound having unsaturation can be prepared by any technique. Such techniques are known in the art and reference is made thereto for the purpose of this invention. While the hydroxyl-containing compound can be separately prepared, it is generally formed simultaneously, commonly as a by-product, with the preparation of a polyol. Techniques and reactants used in preparing the polyols are well-known in the art and such techniques and reactants can be employed in the practice of the present invention. Representative of these techniques are described in *Telechelic Polymers: Synthesis and Applications*, edited by Goethals, E. J., CRC Press Inc., Boca Raton, Fla., published in 1989 and *Polyethers (PO—, and 1,2-epoxide polymers)* by R. A. Newton on pages 633–645 and in Volume 18 of the *Encyclopedia of Chemical Technology*, edited by R. Kirk and D. F. Othmer, John Wiley & Sons, New York 1982; all of which are hereby incorporated herein by reference.

In general, the polyol compositions are prepared by the reaction of an alkylene oxide with an initiator in the presence of a catalyst. Representative alkylene oxides include those of the general structural formula:

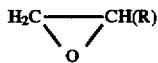

where R can be essentially any organic group which does not interfere with the reaction of the alkylene oxide in the formation of the polyol or the subsequent reactions, if any, of the polyol. Typically, R is hydrogen or an alkyl group having from 1 to about 12, preferably 1 or 2 carbon atoms. A mixture of one or more alkylene oxides is often employed in preparing the polyol composition. Preferably the alkylene oxides employed are an ethylene oxide, propylene oxide, butylene oxide or a mixture of two or more such oxides. In the practice of the present invention, at least a portion of the alkylene oxide is propylene oxide.

Initiators can be any compound which has a functional group capable of reacting with the alkylene oxide. Representative initiators which can be employed in the practice of the present invention are polyhydric alkyl alcohols such as ethylene glycol, diethylene glycol, propylene glycol, dipropylene glycol, glycerine, trimethylolpropane, pentaerythritol; hydroxyl-terminated polyalkylene polyethers; sorbitol; and sucrose; a polycarboxylic acid such as maleic acid, citric acid, succinic acid, and adipic acid; amines such as ethylene diamine, toluene diamine, 4,4'-diaminodiphenylmethane, and diethylenetriamine. In general, glycerine, ethylene glycol, propylene glycol, sucrose, sorbitol, ethylene diamine, and toluene diamine are preferred. The hydroxyl functionality of the polyol composition is primarily dependent on the initiator and is selected accordingly. Most preferably, propylene glycol is used to produce a diol and glycerin is used as an initiator to produce a triol.

Catalysis may proceed by anionic, cationic, or coordinate mechanism depending on the type of catalyst used. Catalysts used in the reaction of the alkylene oxide with the initiator will vary depending on the reaction method being employed and the desired reaction product. For example, in the preparation of polyether polyols, an acid catalyst is commonly used to achieve random microstructure; a base catalyst is commonly employed to achieve head-to-tail microstructure; and a coordination catalyst used to form a stereoregular polymer. Representative examples of acid catalysts which can be employed in the reaction are Lewis acids such as boron trifluoride and other acids described in *The Chemistry of Cationic Polymerization*, by P. H. Plesch, Pergamon Press, Oxford, 1963, and U.K. Patent No. 1,323,184; all of which are hereby incorporated herein by reference. Representative examples of bases which can be used to catalyze the reaction are metal hydroxides such as potassium hydroxide (KOH), sodium hydroxide (NaOH), barium hydroxide (Ba(OH)$_2$) (see, for example U.S. Pat. Nos. 5,114,619 and 5,070,125), cesium hydroxide (Cs(OH)$_2$), and strontium hydroxide (Sr(OH)$_2$); and various amines such as trimethylamine; with KOH or Ba(OH)$_2$ being a preferred base catalyst. Representative coordination catalysts are iron chloride (FeCl$_3$); organometallic compounds such as lithium phosphate hexafluoride; and double metal complexes (zinc hexacyanoferrate (III) cobalt hexacyanoferrate (III)) such as described in U.S. Pat. Nos. 3,427,256; 3,829,505; 3,278, 458; 4,472,560; and 4,477,589; all of which are hereby incorporated herein by reference. Preferably, a base catalyst is employed in preparing the polyol composition with KOH and Ba(OH)$_2$ being particularly preferred.

The alkylene oxide, initiator and catalyst are reacted at conditions sufficient to form the desired polyol composition. While the reaction conditions most advantageously used will vary depending on a variety of factors including the specific reactants and the desired reaction product, in general, the polyol is advantageously formed in a stepwise reaction in an inert (for example, nitrogen) atmosphere. The first step typically comprises forming an alkoxide (alcoholate) ion by contacting the initiator and catalyst (for example, potassium hydroxide) with any water formed during the reaction being removed. Subsequently, the alkylene oxide is contacted with the thus formed alkoxide ion. Reaction between the alkoxide and the alkylene oxide is exothermic with heat generated during the reaction being removed to maintain a proper temperature which is typically from about 80° C. to about 150° C. depending on the desired reaction rate and the composition of the polyol being produced. The reaction is continued until the unreacted alkylene oxide reaches a desired level.

Following reaction, the product is purified to remove the catalyst such as by neutralization, employing high surface area absorbants, water washing using an organic solvent as a diluent, or other methods. For example, the catalyst can be removed from the reaction product by contact with an absorbent such as magnesium or aluminum silicate as described by U.S. Pat. No. 4,029,879; an acetic or formic acid such as described in U.S. Pat. No. 4,521,548; or a solid organic acid as described in U.S. Pat. No. 3,000,963; or contacting the reaction product with a phosphoric acid followed by filtration of the insoluble salts; or finishing with carbon dioxide as described in Japanese Patent Application Publication 55/092,733-A; all of which are hereby incorporated herein by reference. When trimethyl amine or other amine is used as a catalyst, the excess catalyst can be removed by distillation. The reaction product is further purified by removing water and volatile organic compounds and can then be stabilized such as by the addition of antioxidants or saturation with nitrogen.

Representative of the polyols which are found in the polyol composition are polyether polyols (that is, a backbone of poly(alkylene oxide) homo- or copolymer), polyester polyols, polyether-polyester hybrids, polyols having a hydrocarbon backbone and the like. Representative of the preferred polyols are polyether polyols having the general structural formula:

$$I((CH_2-CH(R^1)-O)_n-H)_m$$

wherein I is an initiator residue, generally hydroxy or the residue of an organic, active hydrogen initiator; $R^1$ is hydrogen or alkyl, preferably in each occurrence, independently hydrogen, methyl or ethyl; n is an integer from about 1 to about 200, preferably from about 2 to about 100, more preferably from about 5 to about 75; and m is an integer from about 2 to about 8, preferably from 2 to about 4, more preferably from 3 to 4. Typically, the composition will contain a mixture of polyols where n is not a single integer but different integers with an average from about 5 to about 100, more advantageously from about 10 to about 75. In a preferred embodiment, the polyols are polyols having a poly(propylene oxide/ethylene oxide) backbone or a poly(propylene oxide) based polyol having a molecular weight from about 500 to about 8000.

The polyol compositions of the present invention generally comprise a polyol having two or more hydroxyl (—OH) terminal groups. In general, these hydroxyl terminal groups are the direct result of polyol preparation. In addition to the polyols having only terminal hydroxyl groups, at least a portion, generally a small but not insignificant portion, of the polyol composition will have unsaturation, generally terminal unsaturation, formed during the reaction. While the specific amount of the reaction product having terminal unsaturation will vary depending on a number of factors such as the specific reaction method, the reactants employed, and the reaction conditions such as reaction temperature, catalyst concentration and the like; in general, the reaction product will contain from about 0.01 to about 2 milliequivalents of terminal unsaturation per gram of reaction product which generally corresponds to a monol content of from about 2 to about 60, preferably from about to 10 to about 40, mole percent monol in the reaction product.

The nitrile oxide which can be used to reduce the unsaturation of the hydroxyl-containing compound is a compound having a —C≡N⁺—O⁻ group. While a compound having a single —C≡N⁺—O⁻ group can be employed to react with and reduce the unsaturation, the reaction of such a mononitrile oxide with the unsaturation produces a capped product which may not be further reactive depending on whether or not the mononitrile has other reactive groups. In a preferred embodiment, terminal unsaturation of the hydroxyl-containing compound is reacted with a compound having two or more, preferably two, nitrile oxide groups or a compound having one nitrile oxide and one hydroxyl group. As used herein, the term polynitrile oxide includes a compound having two or more nitrile oxide groups per molecule and includes a dinitrile oxide.

Representative polynitrile oxides are of the formula:

$$R^2-(C\equiv N^+-O^-)_x$$

where x is two or more, preferably from two to about six, more preferably from two to four, and most preferably two; and representative mononitrile oxide hydroxyl-containing compounds are of the formula:

$$HO-R^3-(C\equiv N^+-O^{31})$$

where $R^2$ and $R^3$ are organic moieties which may contain an aromatic group (including heteroaromatic moieties such as pyridines, furans, thiophenes and the like), aliphatic groups or a combination of aromatic and aliphatic groups, including inertly substituted aliphatic or aromatic groups. Preferably, $R^2$ and $R^3$ are aromatic or inertly substituted aromatic moieties; cycloaliphatic, or inertly substituted cycloaliphatic, moieties; or moieties having both aromatic and aliphatic character. The nitrile oxide compounds advantageously used in the practice of the present invention preferentially react with the terminal olefinic unsaturation as opposed to the hydroxyl group of the polyol or water. The nitrile oxide compounds most advantageously used preferentially react with the terminal olefinic unsaturation such that at the conditions of their reaction, the nitrile oxide compound does not react to a significant and deleterious amount with the hydroxyl group of the polyol or water.

In one embodiment, the nitrile oxide is separately prepared and added to the polyol composition. Preferably, in this case, the nitrile oxide forms stable molecules which do not significantly and deleteriously react with each other prior to their reaction with the terminal unsaturation of the polyol. Because nitrile oxide groups on different molecules can dimerize in the absence of stabilizing groups, the separately prepared nitrile oxides are advantageously compounds having the nitrile oxide group(s) adjacent to at least one substituent, such as a sterically hindering group, which 1) inhibits the dimerization of the nitrile oxide-containing compound, and 2) is non-interfering with the reaction between the nitrile oxide groups and terminal olefinic unsaturation. In addition, the nitrile oxide group is preferably not adjacent to another nitrile oxide group.

Examples of aromatic di(nitrile oxide)s include:

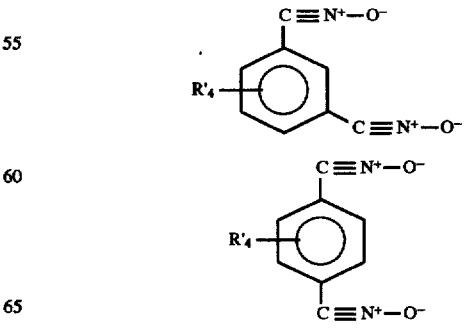

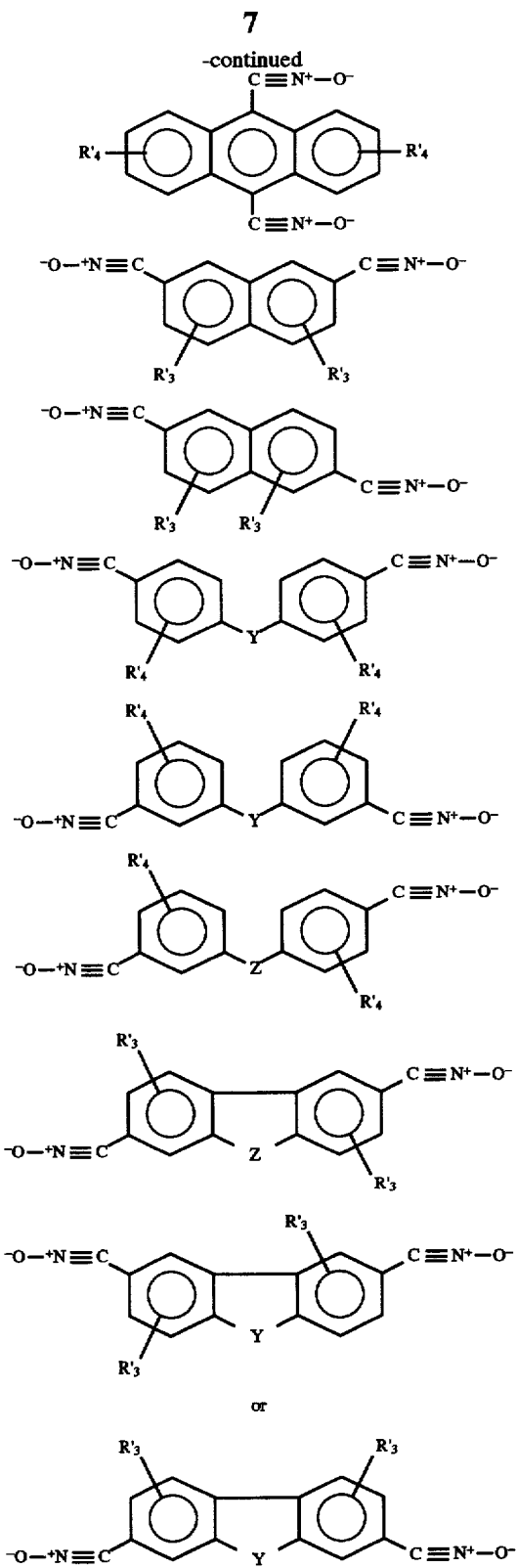

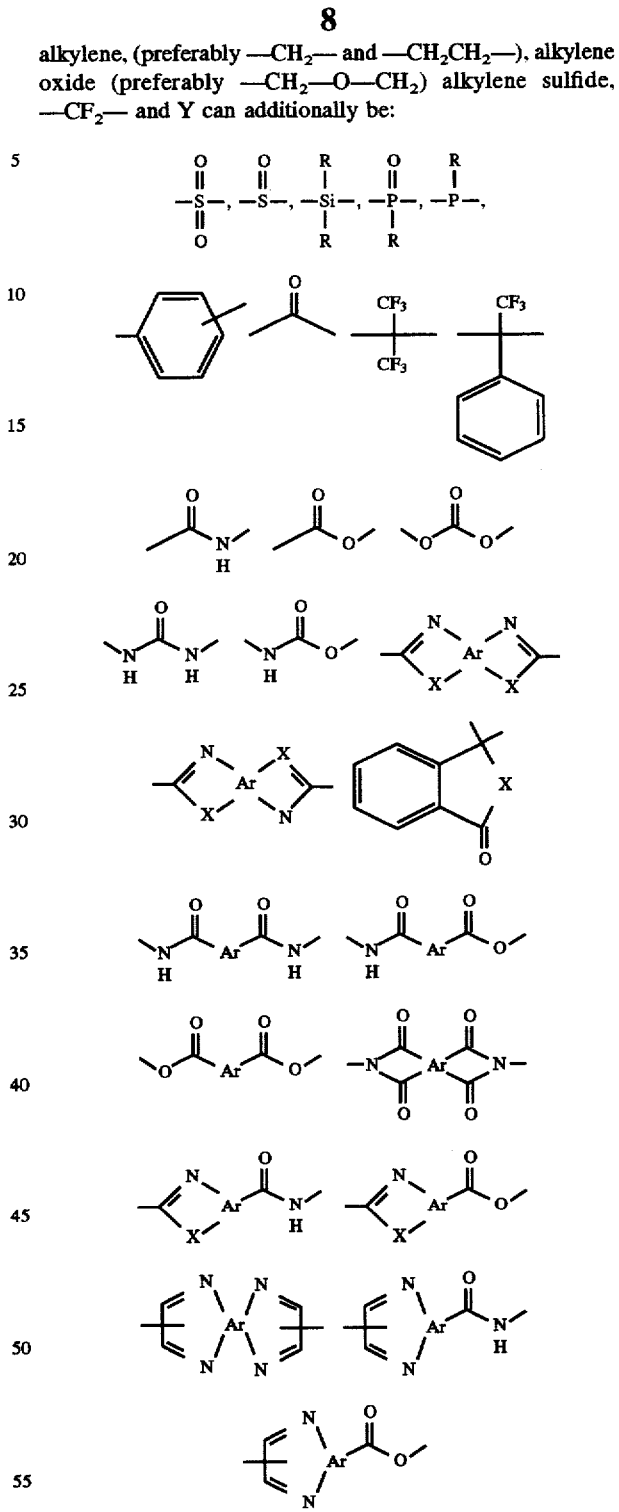

where each R' is independently hydrogen, a hydrocarbyl or inertly substituted hydrocarbyl group such as an alkyl or inertly substituted alkyl or aralkyl, or a halo, preferably Cl, provided that R' are sufficient to stabilize the nitrile oxide groups (for example, the R' groups adjacent to each nitrile oxide group are a steric hindering moiety, preferably methyl or ethyl); Z and Y can be a covalent bond, —O—, —S—, alkylene, (preferably —CH$_2$— and —CH$_2$CH$_2$—), alkylene oxide (preferably —CH$_2$—O—CH$_2$) alkylene sulfide, —CF$_2$— and Y can additionally be:

where Ar can be an aromatic hydrocarbon or halogenated derivative thereof.

Preferably, each R' is independently hydrogen, methyl or ethyl with each R' being chosen to render the nitrile oxide sufficiently stable for its desired end use; and each Z or Y is —O—, —S—, —CH$_2$—, —CH$_2$CH$_2$— or CH$_2$—O—CH$_2$.

The preferred aromatic di(nitrile oxide)s are:

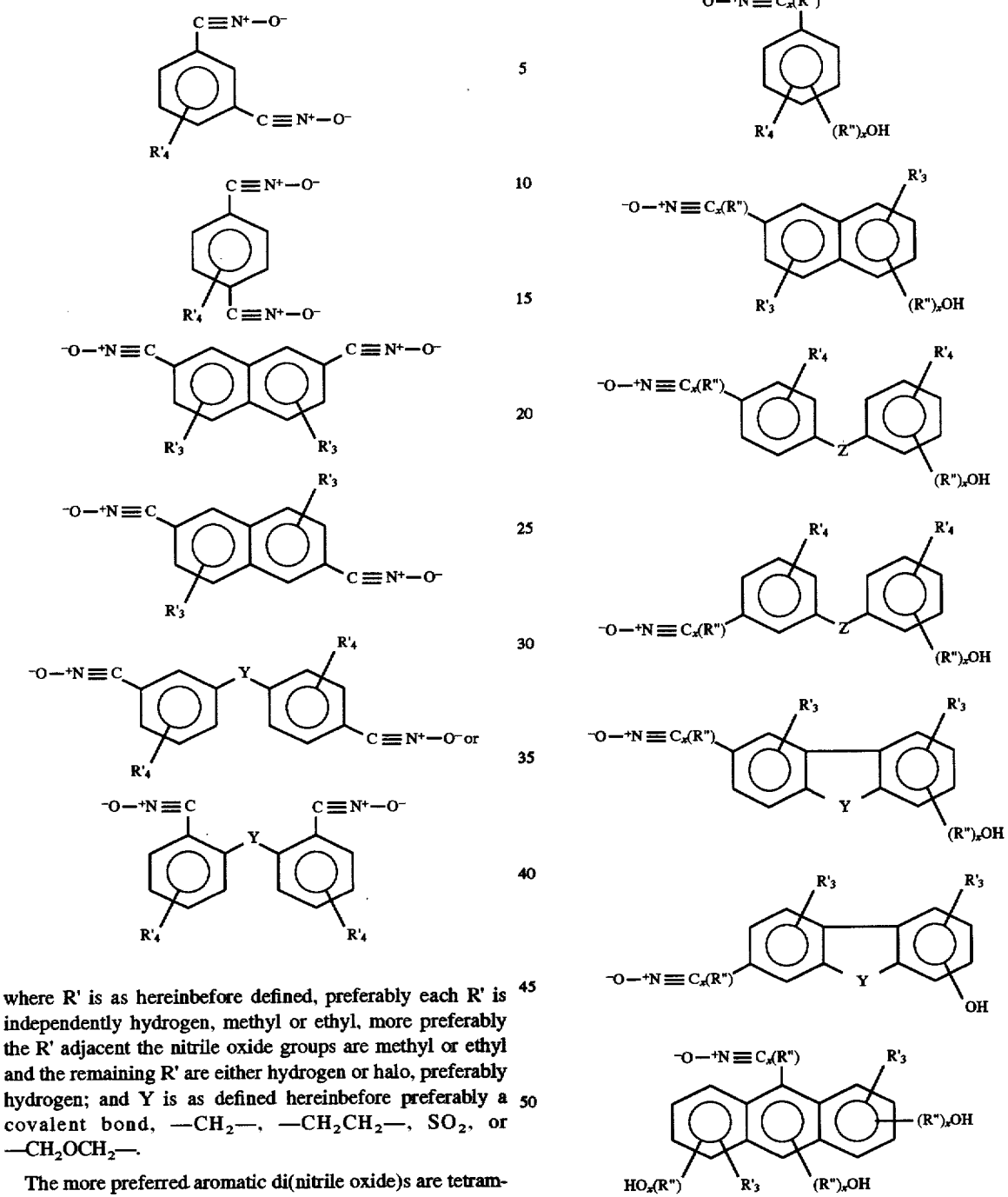

where R' is as hereinbefore defined, preferably each R' is independently hydrogen, methyl or ethyl, more preferably the R' adjacent the nitrile oxide groups are methyl or ethyl and the remaining R' are either hydrogen or halo, preferably hydrogen; and Y is as defined hereinbefore preferably a covalent bond, —$CH_2$—, —$CH_2CH_2$—, $SO_2$, or —$CH_2OCH_2$—.

The more preferred aromatic di(nitrile oxide)s are tetramethyl terephthalonitrile, N,N'- dioxide; 3,3-alkylenebis(2,4, 6-trimethylbenzonitrile) N,N'-dioxide; 4,4'-alkylenebis(2,4, 6-trimethylbenzonitrile) N,N'-dioxide; 1-methyl-2,6-bis (nitrile oxide)-phenylsulfonate ester; 3,3'-(1,2-ethanediyl) bis(2,4,6-trimethylbenzonitrile) N,N'-dioxide; 3,3-alkylenebis-(5-chloro-2,4,6-trimethylbenzonitrile) N,N'-dioxide; 2,2'-sulfonylbis(benzonitrile) N,N'-dioxide; and 2,7-bis(nitrile oxide)anthracene, and oligomers of these compounds; with 2,6-bisnitrile oxido-1,3,5-triethylbenzene being most preferred.

Representative examples of aromatic, hydroxyl-containing nitrile oxide compounds include:

where R', x, Z and Y are as hereinbefore defined; with:

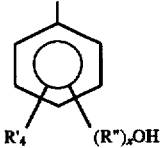

-continued

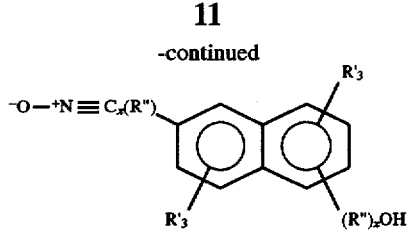

being the preferred aromatic, hydroxyl-containing nitrile oxide compounds.

The polynitrile oxide or hydroxyl-containing nitrile oxide compound can be prepared by techniques known in the art and reference is made thereto for the purposes of this invention. See, for example, Grundmann and Grunanger, *Nitrile Oxides*, Springer, New York, pages 31–61, which is incorporated herein by reference. For example, a di(nitrile oxide) can be prepared by (i) reacting a primary alkyl nitrate with phenyl isocyanate; or (ii) reacting an aldehyde with hydroxyl amine to form a hydroxyamoyl aldehyde (aldoxime), subsequently reacting the aldoxime with chlorine (in the form of chloride anion) or bleach in the presence of an acid or a base to form a hydroxyamoyl chloride, and then reacting the hydroxyamoyl chloride with base to form a nitrile oxide group (see, for example, U.S. Pat. No. 3,717,560, issued Feb. 20, 1973), which is incorporated herein by reference; or (iii) adding 2-chloroacetyl chloride to an aromatic ring by Friedel-Crafts addition in the presence of a Lewis acid, reacting the pendant acetyl chloride with nitric acid to form a hydroxyamoyl chloride, and reacting the hydroxyamoyl chloride with base to form a nitrile oxide group (see, for example, "One-Component Sealant Based on 1,3-Dipoles," Vol. 32, *J. App. Poly. Sci.* 4657 (1986)), which is incorporated herein by reference. Nitrile oxides having a hydroxyl group are prepared using similar techniques.

In an alternative embodiment, the nitrile oxide can be prepared in situ, that is, prepared in the polyol composition, and the thus prepared nitrile oxide reacted with terminal unsaturation. For example, a suitable di(poly)hydroxyamoyl chloride or hydroxyl-containing hydroxyamoyl chloride can be added after preparation of the polyol composition, preferably before removal of the catalyst. The base or acid catalyst which is commonly employed in preparing the polyol composition can convert the hydroxyamoyl chloride to a nitrile oxide for subsequent reaction with terminal unsaturation. In such case, the nitrile oxide need not be and is preferably not sterically hindered. Alternatively, a furoxan-containing compound, for example, a compound of the formula $C_2R''_2N_2O_2$, that is,

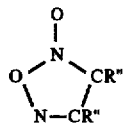

where each R" is independently a hydrocarbyl or inertly substituted hydrocarbyl or both R" together form a cyclic or bicyclic (bridged) group, can be employed. As described in *Advances in Heterocyclic Chemistry*, Vol. 29, pages 251–340, "Furoxans and Benzofuroxans," by A. Gasco and A. J. Boulton, particularly pages 287–289, furoxan can be thermally ring-opened or thermally cleaved to form a dinitrile oxide of hydroxy-containing nitrile oxide. Representative examples of such groups include furoxan itself, that is, $C_2H_2N_2O_2$ and camphorfuroxan.

In the practice of this invention, the hydroxyl-containing compound having unsaturation is contacted with the polynitrile oxide or hydroxyl-containing nitrile oxide compound in an amount and at conditions such that the nitrile oxide moiety reacts with the unsaturation of the hydroxyl-containing compound. In general, the hydroxyl-containing compound having unsaturation is a component of a polyol composition and the unsaturation is terminal unsaturation; with the hydroxyl-containing compound often being a monol having terminal unsaturation. While the amounts of the nitrile oxide and conditions most advantageously employed will vary depending on the specific nitrile oxide compound and polyol composition employed, in general, the polyol composition is contacted with sufficient amounts of the nitrile oxide compound to react the desired amount of the unsaturation with the nitrile oxide. Advantageously, the nitrile oxide is employed in an amount which provides at least a stoichiometric equivalent or stoichiometric excess of nitrile oxide groups in relation to the unsaturation. Advantageously, the nitrile oxide is employed in an amount of at least about 0.8, preferably at least about 0.9, and more preferably at least about 0.95 equivalent of nitrile oxide groups per terminal unsaturated groups. Advantageously, the nitrile oxide is employed in an amount of less than about 2, preferably less than about 1.5, and more preferably less than about 1.25, equivalent of nitrile oxide groups per terminal unsaturated group. Most preferably, the nitrile oxide compound is employed in an amount such that the resulting mixture of the nitrile oxide and polyol composition will comprise from about 1 to about 1.1 equivalent of nitrile oxide groups per unsaturated groups.

The reaction of the nitrile oxide and unsaturated groups normally can take place at room or ambient temperature (for example, about 25° C.) and the nitrile oxide compound and polyol composition can simply be mixed at these temperatures for reaction. However, depending on the desired rate of reaction, temperatures of as low as about −10° to about 200° C. or higher can be employed, with temperatures from about 10° to about 150° C. being preferred. At these temperatures, reaction is complete within from about a couple of seconds to 100 hours. At ambient temperatures, reaction is substantially complete within about 30 minutes to about 48 hours. At an elevated temperature of about 110 to 150° C., reaction is substantially complete in less than about one hour, more generally, in less than about 30 minutes and preferably in less than about 10 minutes.

While not being bound by theory, the reaction of the nitrile oxide and the unsaturation of the polyol is believed to be represented by the reaction of a di(nitrile oxide) and a polyol having terminal unsaturation:

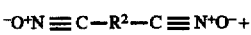

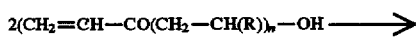

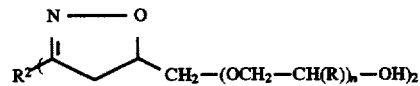

or the reaction of a nitrile oxide hydroxide with a polyol having terminal unsaturation:

-continued

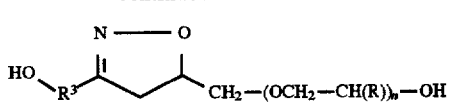

wherein R, R², and R³ are as hereinbefore described. In either case, the compound formed in the reaction has no terminal unsaturation and preferably only hydroxyl terminal groups. The resulting polyol is believed to have isoxazoline groups (that is,

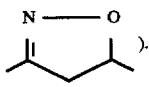

The preferred polyol products have the formula:

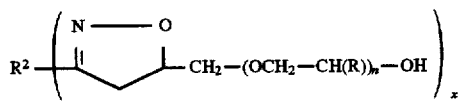

where R, R², x, and n are as hereinbefore defined.

The nitrile oxide and polyol can be contacted at essentially any time following preparation of the polyol. When the nitrile oxide is prepared in situ, it is preferably contacted with the polyol composition prior to the removal of the catalyst. Subsequent to the reaction of the nitrile oxide and the terminal unsaturation, the resulting product can be purified using conventional techniques. When a separately prepared polynitrile oxide is added to the polyol composition, the polynitrile oxide is preferably added following the removal of the catalyst from the reaction product, more preferably after purification but prior to stabilization of the product. Following reaction of the nitrile oxide with the polyol composition, the composition can be stabilized using conventional techniques and subsequently used without further treatment.

The following examples are presented for the purpose of illustration only. They should not be taken as limiting the scope of either the specification or the claims. Unless otherwise stated all, parts and percentages are by weight.

EXAMPLE 1

71.13 Grams (g) (0.1 moles) of an allyl alcohol initiated monol of a copolymer of ethylene oxide and propylene oxide having an —OH content of 2.39 percent, a 3.58 percent vinyl unsaturation (about 1.34 meq/g and a viscosity of 32 centipoise at 100° F. (38° C.) is dissolved in 25 g of anhydrous tetrahydrofuran at room temperature in a round-bottomed flask equipped with a magnetic stirrer. While stirring the resulting solution, 6.10 g (0.025 mole) of 2, 6-bisnitrileoxido-1,3,5-triethylbenzene is added over a period of 30 seconds to 1 minute at room temperature. The mixture is then stirred at room temperature for 3 days. At the end of this period, Fourier Transform InfraRed (FTIR) testing indicated that all nitrile oxide had reacted.

The results of this testing shows the efficacy of reacting the terminal unsaturation with a dinitrile oxide.

Similar results are obtained with additional allyl alcohol initiated monols of a copolymer of ethylene oxide and propylene oxide having a hydroxy equivalent weight of 1414; polymers of butylene oxide having hydroxy equivalent weights of 346, 418, or 900; and a polymer of ethylene oxide having a hydroxy equivalent weight of 498.

EXAMPLE 2

To 35 grams of a glycerine initiated polyol (Voranol™ 5815 of The Dow Chemical Company) having an average molecular weight of about 5000 (corresponding to a hydroxyl equivalent weight of about 1667) and about 0.072 monol milliequivalent per gram (meq/g) of polyol (as measured by the degree of unsaturation), which corresponds to about 27.3 mole percent monol in a round-bottomed flask is added a stoichiometrically equivalent amount of tetramethyl terephthalonitrile, N,N'-dioxide (0.3074 g). The flask is placed in an oil bath maintained at 110° C. The solid dinitrile oxide dissolves in 5 to 10 minutes in the polyol composition. The polyol composition is stirred continuously during addition of the nitrile oxide and thereafter. Thirty minutes after complete dissolution of the dinitrile oxide compound, a sample is drawn from the mixture and cooled in a refrigerator to 8° C. This sample was then analyzed using Fourier Transform InfraRed (FTIR) which indicated that the residual unsaturation was 0.012 meq/g. Using the same analytical techniques, samples withdrawn at one hour, 1.5 hours, 2 hours, 2.5 hours and 3 hours after complete dissolution of the dinitrile oxide show about the same meq/g unsaturation; indicating the effectiveness of a dinitrile oxide in reducing unsaturation.

EXAMPLE 3

Using techniques similar to those of Example 2, to 20 g of a propylene glycol initiated diol (Voranol™ 2140 of The Dow Chemical Company having a molecular weight of about 4000 (a nominal hydroxyl equivalent weight of about 2000) and having about 0.129 meq/g monol (as measured by the degree of unsaturation), which corresponds to about 41.8 mole percent monol is added a stoichiometrically equivalent amount of tetramethyl terephthalonitrile, N,N'-dioxide (0.3148 g). The resulting mixture is placed in an oil bath maintained at 50° C. and the solid dinitrile oxide dissolves in about 45 to 60 minutes. About two hours after complete dissolution of the dinitrile oxide compound, a sample is drawn from the mixture and measured by titration with mercuric acetate as described in ASTMD-2849-69 to have 0.064 meq/g unsaturation. A sample drawn at 4 hours shows about 0.05 meq/g of unsaturation and at 8 hours about 0.028 meq/g.

In a similar manner except that the oil bath is maintained at 80° C., Voranol™ 2140 is treated with a stoichiometric amount of tetramethyl terephthalonitrile, N,N'-dioxide. At this temperature, the dinitrile oxide dissolves in about 10 minutes. A sample drawn at 2 hours is found by the techniques described above (ASTMD-2849-69) to have unsaturation of 0.024 meq/g. After four hours, the unsaturation is measured to be 0.017 meq/g.

In a similar manner except that the dinitrile oxide is added over a five-minute period and the oil bath is heated to 110° C., Voranol™ 2140 is treated with a stoichiometric amount of tetramethyl terephthalonitrile, N,N'-dioxide. At this temperature, the dinitrile oxide essentially immediately dissolves in the polyol composition. Fifteen minutes after complete addition of the dinitrile oxide, the sample is found to contain 0.014 meq/g unsaturation (ASTMD-2849-69). The polyol composition showed similar levels of unsaturation thirty and sixty minutes after complete addition of the dinitrile oxide.

This example shows the effectiveness of the dinitrile oxide in reducing unsaturation. The effectiveness of the dinitrile oxide and rate of reaction is dependent on the temperature and time of the contact between the dinitrile oxide and the polyol composition.

EXAMPLE 4

To a 350 g sample of a glycerine initiated propylene oxide triol capped with ethylene oxide (Voranol™ 4701 of The Dow Chemical Company) having a molecular weight of about 5000 (a nominal hydroxyl equivalent weight of about 1667) and about 0.067 meq/g monol (as measured by the degree of unsaturation) maintained at 105° C. in a round-bottomed flask, is added, with continuous agitation, a stoichiometrically equivalent amount of tetramethyl terephthalonitrile, N,N'-dioxide in 10 equal additions of 0.286 g each. The solid dinitrile oxide dissolves essentially immediately upon addition in the polyol composition. Five minutes after complete dissolution of the dinitrile oxide compound, a sample is drawn from the mixture and found to contain 0.025 meq/g unsaturation (ASTMD-2849-69). At fifteen minutes after complete dinitrile oxide addition, this has been reduced to 0.20 meq/g unsaturation. At thirty minutes, the unsaturation is found to be 0.016 meq/g and at sixty minutes, the unsaturation is found to be 0.013 meq/g.

Using the same procedure as described above, the unsaturation of Voranol™ 5815 was reduced from an initial unsaturation of 0.07 meq/g to 0.031 meq/g in 5 minutes, 0.022 meq/g in 15 minutes, 0.019 meq/g in 30 minutes and 0.016 meq/g in 60 minutes.

EXAMPLE 5

To a 700 g sample of Voranol™ 2140 maintained at 110° C. under nitrogen atmosphere is added, with continuous agitation, a stoichiometric amount (11.02 g) of tetramethyl terephthalonitrile, N,N'-dioxide over a five minute period. The resulting mixture was stirred and maintained at 110° C. for 15 minutes and then the sample quickly cooled in a refrigerator to about 8° C. The unsaturation was found to have been reduced to 0.023 meq/g (ASTHD-2849-69).

Using the same techniques, the unsaturation of Voranol™ 4701 was reduced from 0.067 meq/g to 0.012 meq/g and the unsaturation of Voranol™ 5815 was reduced from 0.72 meq/g to 0.017 meq/g.

EXAMPLE 6

To a 100 g sample of Voranol™ 2140 (unsaturation 0.129 meq/g) maintained at 100° C., under nitrogen atmosphere, is added 105 percent of the stoichiometric amount of camphorfuroxan (1.32 g) which dissolves essentially immediately upon addition. The resulting mixture is stirred continuously and its temperature maintained at 100° C. Samples are taken after 2, 4 and 6 hours and tested for unsaturation (ASTMD-2849-69). The results of this testing, as well as the results of testing of other samples of Voranol™ 2140 treated at the same conditions except the mixtures are maintained at a temperature of 120° C. and 130° C., are set forth in Table 1.

TABLE 1

| Time, hrs. | Unsaturation at the Specified Temperature and Time, meq/g | | |
|---|---|---|---|
| | 100° C. | 120° C. | 130° C. |
| 0 | 0.129 | 0.129 | 0.129 |
| 2 | 0.107 | 0.080 | 0.057 |
| 4 | 0.098 | 0.065 | 0.052 |
| 8 | 0.084 | 0.048 | 0.044 |

As indicated in Table 1, the camphorfuroxan, a compound which forms nitrile oxide in situ, reduces the unsaturation of the polyol composition. The amount and rate at which the unsaturation is reduced is dependent on the temperature of the polyol composition.

The same procedure is repeated but the polyol composition is maintained at 140° C. After 24 hours, the unsaturation is reduced to 0.048 meq/g and after 48 hours is reduced to 0.045 meq/g.

The same procedure is repeated but 150% of the stoichiometric amount of the camphorfuroxan is added to a new sample of Voranol™ 2140 maintained at 130° C. After one hour, the unsaturation of the polyol composition drops to 0.039 meq/g. After eight hours of reaction, the unsaturation drops to 0.032 meq/g and after 24 hours, drops to 0.026 meq/g.

EXAMPLE 7

In a manner similar to that of Example 5, to a 100 g sample of Voranol™ 4701 (unsaturation 0.067 meq/g) maintained at 120° C., under nitrogen atmosphere, is added 150% of the stoichiometric amount (0.975 g) of camphorfuroxan which dissolved essentially immediately upon addition. After 4 hours at this temperature, the unsaturation is found to have been reduced to 0.036 meq/g (ASTMD-2849-69). After 8 hours, the unsaturation is reduced to 0.029 meq/g and after 24 hours is reduced to 0.027 meq/g.

In a similar manner, to a 100 g sample of Voranol™ 5815 (unsaturation 0.072 meq/g) maintained, under nitrogen atmosphere, at 120° C., is added 150% of the stoichiometric amount of camphorfuroxan (1.019 g) which dissolved immediately upon addition. After 4 hours of being maintained at this temperature, the unsaturation is reduced to 0.028 meq/g (ASTMD-2849-69). After 8 hours at this temperature, the unsaturation is reduced to 0.027 meq/g and after 24 hours is reduced to 0.026 meq/g.

EXAMPLE 8

To 2500 g of Voranol™ 4701 (unsaturation 0.067 meq/g) maintained at 115° C., under nitrogen atmosphere, is added 20.74 g of tetramethyl terephthalonitrile, N,N'-dioxide (100% of the stoichiometric amount). This mixture is stirred for 30 minutes and an additional 1.24 g (5 percent of the stoichiometric amount) of tetramethyl terephthalonitrile, N,N'-dioxide is added. The mixture is stirred for an additional 1.5 hours. At this time, the unsaturation is found to be 0.0081 meq/g. This example indicates that the sequential addition of the nitrile oxide compound may be more effective in reducing unsaturation than a single addition of nitrile oxide.

EXAMPLE 9

To 500 g of Voranol™ 4701 (unsaturation 0.068 meq/g) maintained at 115° C., under nitrogen atmosphere, is slowly added an equivalent amount (1.584 g) of 3-hydroxymethyl-2,4,6-triethylbenzonitrile oxide, a mononitrile oxide having a hydroxyl group. This solid material dissolved essentially immediately upon addition. This mixture is stirred for 3 hours. At this time, no unsaturation is found in the composition tested.

What is claimed is:

1. A composition comprising (a) a polyol of the formula:

wherein I is an initiator remnant; $R^1$ is hydrogen or alkyl, in each occurrence; n is an integer from 1 to 200; and m is an integer from 2 to 8 and (b) a polyol having an isoxazoline group.

2. The composition of claim 1 wherein at least a portion of component (b) is the reaction product of an unsaturated hydroxyl containing compound and a nitrile oxide.

3. The composition of claim 2 wherein component (a) is a polyether polyol having a poly(propylene oxide/ethylene oxide) group or a poly (propylene oxide) group and component (b) is the reaction product of a nitrile oxide with a propoxylated allyl alcohol.

4. The composition of claim 3 wherein the nitrile oxide is a polynitrile oxide represented by the formula:

or a mononitrile oxide hydroxide represented by the formula:

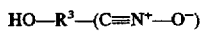

wherein $R^2$ and $R^3$ are organic groups and x is 2 to 6.

5. The composition of claim 4 wherein the nitrile oxide is an aromatic di(nitrile oxide) of the formula:

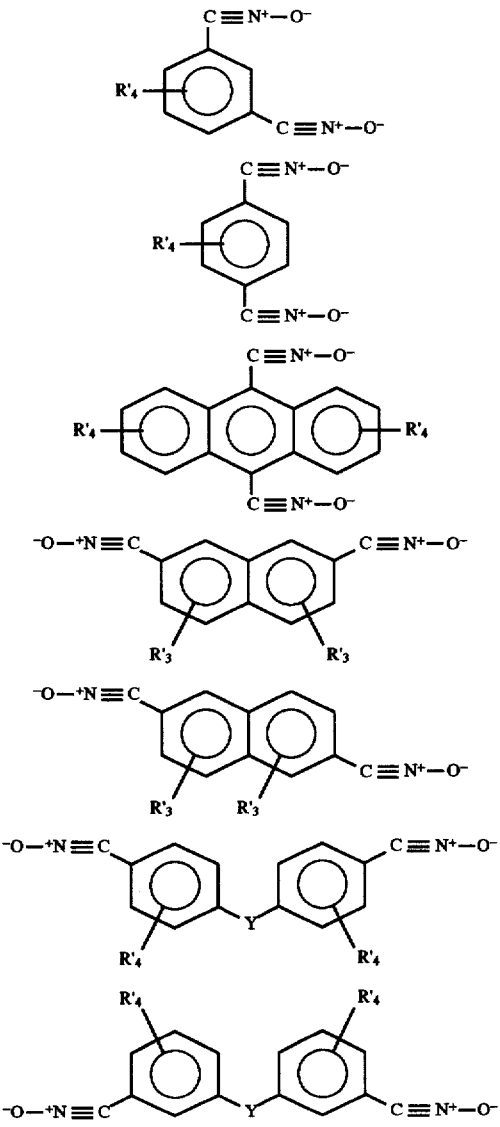

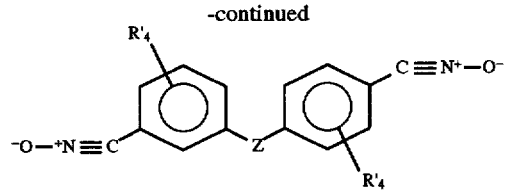

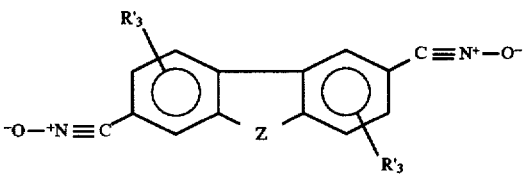

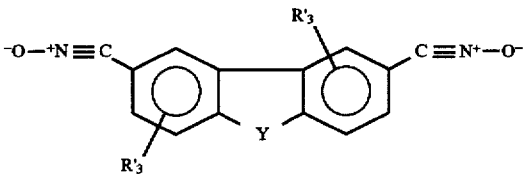

or

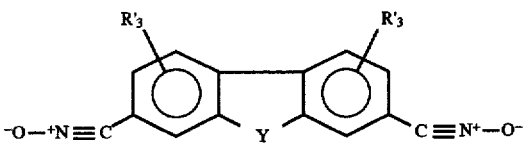

where R' is independently hydrogen, hydrocarbyl, inertly substituted hydrocarbyl, aralkyl, or halo provided that the R' groups are sufficient to stabilize the nitrile oxide groups; each Z is a covalent bond, —O—, —S—, alkylene, alkylene oxide, alkylene sulfide, or —CF$_2$— and each Y is a covalent bond, —O—, —S—, alkylene, alkylene oxide, alkylene sulfide, —CF$_2$—,

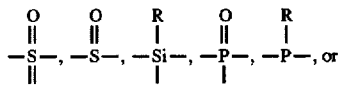

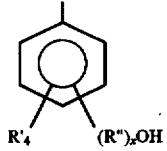

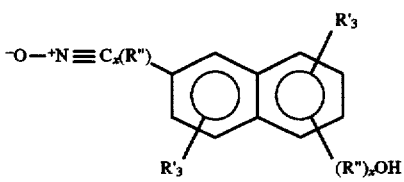

where Ar is an aromatic hydrocarbon or halogenated compound thereof.

6. The composition of claim 5 wherein the R' groups adjacent to each nitrile oxide group are a steric hindering group when the nitrile oxide is not formed in situ, and each Z and Y are independently alkylene, alkylene oxide, or alkylene sulfide.

7. The composition of claim 6 wherein the R' groups adjacent to each nitrile oxide group are methyl or ethyl and each Y or Z is —CH$_2$, —CH$_2$CH$_2$—, or —CH$_2$—O—CH$_2$—.

8. The composition of claim 4 wherein the nitrile oxide is a compound of the formula:

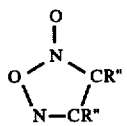

where each R" is independently a hydrocarbyl or inertly substituted hydrocarbyl group or both R" together form a cyclic or bicyclic (bridged) ring.

9. The composition of claim 5 wherein the aromatic di(nitrile oxide) is:

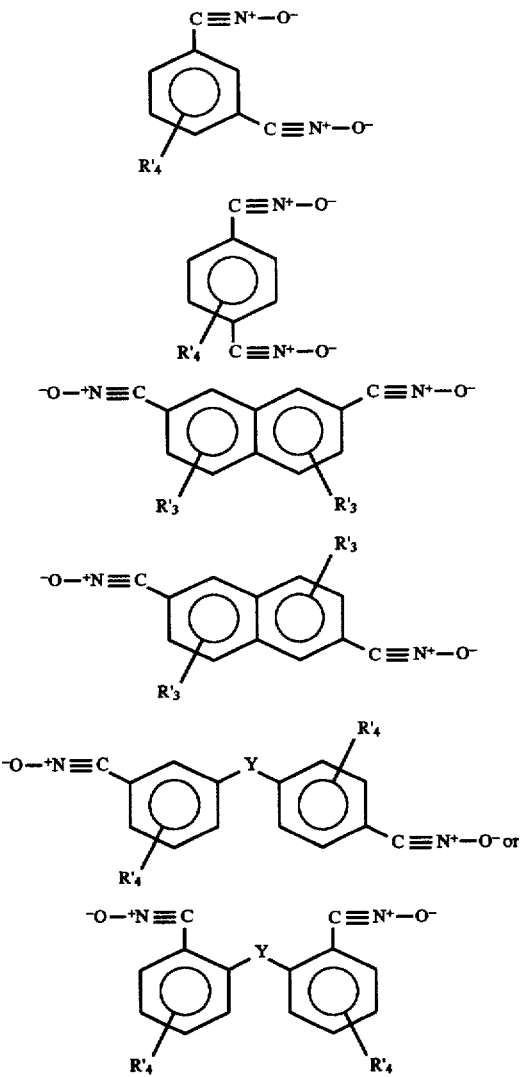

where each R' is independently hydrogen, hydrocarbyl, inertly substituted hydrocarbyl, aralkyl, or halo provided the R' groups are sufficient to stabilize the nitrile oxide groups;
and each Z and Y is a covalent bond, —O—, —S—, alkylene, alkylene oxide, alkylene sulfide, or —$CF_2$—.

10. The composition of claim 9 wherein the R' groups adjacent to each nitrile oxide group are methyl or ethyl and each Y or Z is —$CH_2$, —$CH_2CH_2$—, or —$CH_2$—O—$CH_2$—.

11. The composition of claim 10 wherein aromatic di(nitrile oxide) is tetramethyl terephthalonitrile, N,N'-dioxide.

12. The composition of claim 3 where the nitrile oxide is a nitrile oxide of the formula:

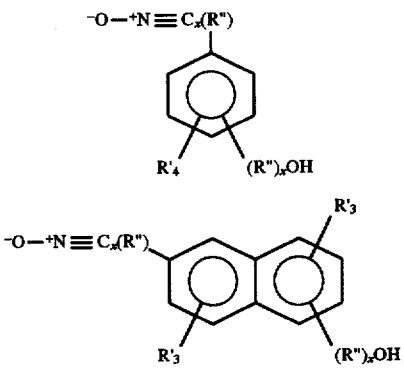

where R' is independently hydrogen, hydrocarbyl, inertly substituted hydrocarbyl, aralkyl, or halo.

13. The composition of claim 1 which comprises a compound of the formula:

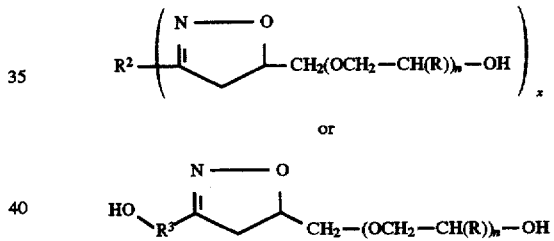

wherein R is hydrogen or an alkyl group having from 1 to about 12 carbon atoms, $R^2$ and $R^3$ are organic groups, n is from about 1 to about 200, and x is two or more.

14. The polyol composition of claim 1 wherein the nitrile oxide is tetramethyl terephthalonitrile, N,N'-dioxide; 3,3-alkylenebis(2,4,6-trimethylbenzo-nitrile) N,N'-dioxide; 4,4'-alkylenebis(2,4,6-trimethylbenzonitrile) N,N'-dioxide; 1-methyl-2,6-bis (nitrile oxide)-phenylsulfonate ester; 3,3'-(1,2-ethanediyl) bis(2,4,6-trimethylbenzonitrile) N,N'-dioxide; 3,3-alkylenebis(5-chloro-2,4,6-trimethylbenzonitrile) N,N'-dioxide; or 2,2'-sulfonylbis (benzonitrile) N,N'-dioxide.

15. A composition comprising (a) a polyether polyol having a poly(propylene oxide/ethylene oxide) group or a poly(propylene oxide) group and (b) the reaction product of a nitrile oxide with a propoxylated allyl alcohol.

* * * * *

UNITED STATES PATENT AND TRADEMARK OFFICE
CERTIFICATE OF CORRECTION

PATENT NO.   : 5,736,748
DATED        : April 7, 1998
INVENTOR(S)  : Zenon Lysenko; Ritchie A. Wessling; Debkumar Bhattacharjee It is certified that error appears in the above-identified patent and that said Letters Patent is hereby corrected as shown below:

Title page,
Under "Related U.S. Application Data", [60], the number should read -- 60/001,016. --

Signed and Sealed this

Thirtieth Day of October, 2001

*Attest:*

NICHOLAS P. GODICI
*Attesting Officer*       *Acting Director of the United States Patent and Trademark Office*